United States Patent
Bjorn

[15] 3,680,390
[45] Aug. 1, 1972

[54] APPARATUS AND METHODS FOR ANALYZING UNBALANCE IN ROTATABLE BODIES

[72] Inventor: Thomas E. Bjorn, Northbrook, Ill.

[73] Assignee: Stewart-Warner Corporation, Chicago, Ill.

[22] Filed: July 9, 1970

[21] Appl. No.: 53,512

[52] U.S. Cl. .................... 73/457, 73/459, 73/466
[51] Int. Cl. ..................... G01m 1/22, G01m 1/18
[58] Field of Search ............. 73/462, 466, 457, 459

[56] References Cited

UNITED STATES PATENTS

| | | | |
|---|---|---|---|
| 3,331,252 | 7/1967 | Thomas et al. | 73/462 |
| 2,740,297 | 4/1956 | Phelps | 73/466 |
| 3,078,720 | 2/1963 | Hofmann, Jr. | 73/457 |
| 3,030,813 | 4/1962 | Crawford et al. | 73/466 |
| 3,533,296 | 10/1970 | Foster et al. | 73/466 |
| 2,383,405 | 8/1945 | Merrill et al. | 73/457 |

Primary Examiner—James J. Gill
Attorney—Augustus G. Douvas, William J. Newman and Norton Lesser

[57] ABSTRACT

Apparatus and methods for analyzing substance in a rotatable body whereby vibrations caused by the body rotating with a known amount of weight applied thereto are compared with the rotations of the body rotating without the known amount of weight. Vibration signals storage means enable the signals to be applied to a meter as desired and adjustment means for the meter are provided so that the meter may be calibrated for direct readout of the amount of unbalance.

13 Claims, 6 Drawing Figures

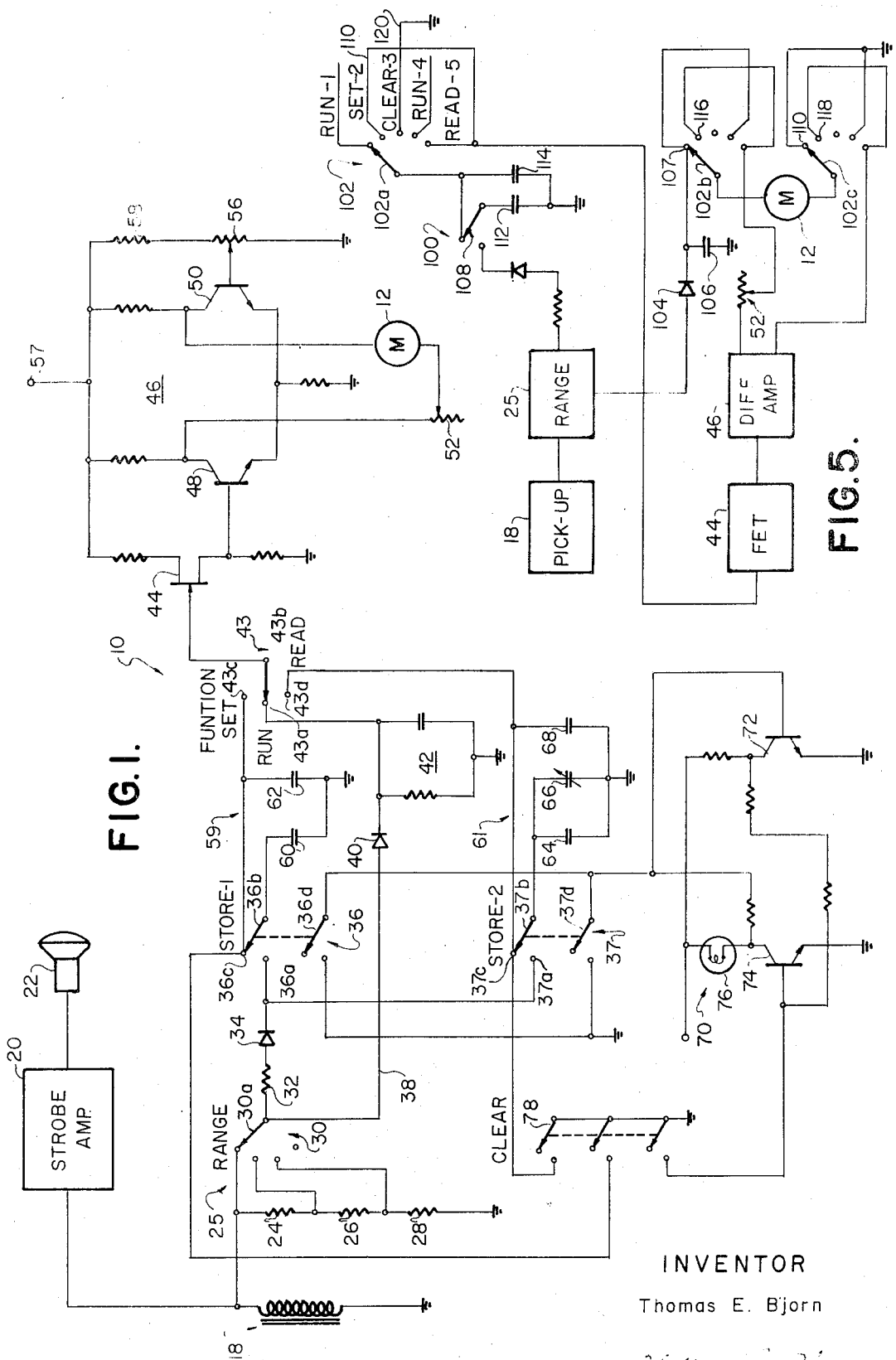

PATENTED AUG 1 1972 3,680,390
SHEET 2 OF 2
FIG. 3.
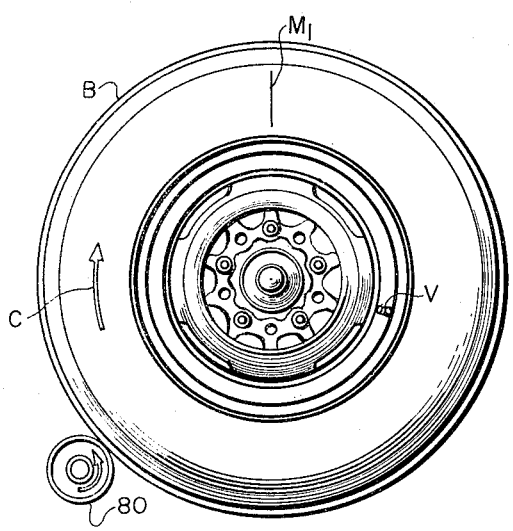
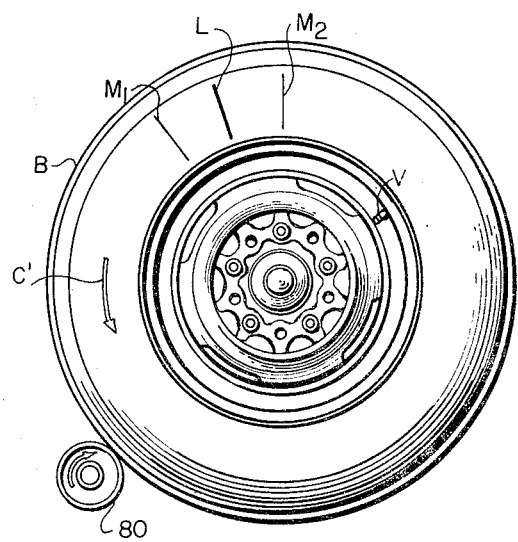
FIG. 4.
FIG. 2.
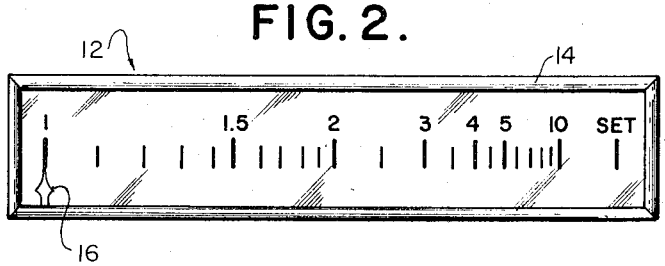
FIG. 6.
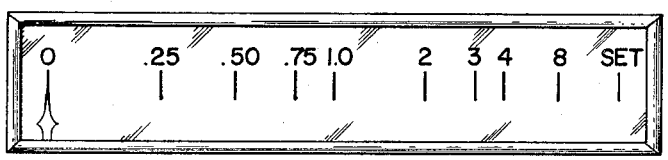
INVENTOR
Thomas E. Bjorn
By William G. Newman
ATTORNEY

APPARATUS AND METHODS FOR ANALYZING UNBALANCE IN ROTATABLE BODIES

BACKGROUND OF THE INVENTION

This invention is directed to the analysis of unbalance in rotating bodies and more particularly to the analysis of unbalance in bodies which are mounted for rotation in oscillating suspension systems.

While the teachings of this invention are particularly relatable to the electronic analysis of rotating bodies in situ such as vehicle wheels, it will be apparent that they may also be applied to other types of balance analyzers in which the bodies are mounted for rotation on oscillating systems. Therefore, the disclosure herein will be directed primarily to apparatus and methods for analyzing a vehicle wheel unbalance with appropriate mention of applicable features to other types of vibration analyzers.

The electronic analysis of unbalance in rotating vehicle wheels mounted on a vehicle suspension system is a more accurate mode of operation than that accomplished by static balancers or the mechanical dynamic types. The static method of analyzation is represented by the bubble balancer. It has disadvantages in that the wheel must be removed from the vehicle and therefore does not take into account the dynamic factors presented by the vehicle suspension system or the unbalance caused by the wheel mounting means, the brake and the wheel disc. The dynamic method represented by mechanical wheel balancers does operate to analyze the unbalance in situ, but it has the disadvantage that a foreign body is attached to the wheel, thus bringing into play its own dynamic characteristics in the analyzing process. In addition, both of the above types of devices have a serious disadvantage in that they are capable only of analyzing "static" or "force" type of unbalance but are unable to analyze "dynamic" or "couple" type of unbalance with any degree of accuracy.

The electronic unbalance analyzers have been developed so that vehicle wheels may be analyzed for unbalance in their natural setting without adding any foreign objects to the rotating body. An example of this type of apparatus and its method of operation is shown in the U.S. Pat. No. 2,383,405 issued to Marcellus S. Merrill Aug. 21, 1945. While such devices have great advantages over mechanical types, they are often difficult to use because of the different wheel suspension characteristics among the various makes and types of vehicles. The suspension system of each vehicle has its own vibration damping characteristics in view of the particular construction and the condition of the parts making up the system. These variables made it difficult not only to determine the exact angular location of the unbalance, but also made it virtually impossible to calibrate the equipment for direct readout of the amount of unbalance. Since some systems are quite loose with a low level of damping, while others are very tight with a high amount of damping, it can be recognized that the same amount of unbalance in the different systems will present different electronic signal levels in the analyzing apparatus. A readout device such as an electric meter, therefore, could not be meaningfully calibrated to give an accurate indication of the amount of weight to be added to the vehicle wheel to curb the unbalance. A trial and error procedure was therefore required by which the weights were added or subtracted and the wheel spun up to procedure speed each time to determine the effect on the measured vibrations.

SUMMARY OF THE INVENTION

This invention provides a method and apparatus whereby a direct readout of the amount of unbalance in a rotating body may be determined with an electronic analyzing system so as to minimize the number of operating steps in the analysis of such unbalance. To this end applicant provides the method and means by which the body to be analyzed is rotated about its axis of rotation with a known amount of correction weight attached thereto along the locus of unbalance and also without the known correction weight. An indication is obtained of the amplitude of vibration caused by the unbalance for each rotation and the proportion of change of the amplitude of vibration between the rotations is determined. The amount of actual unbalance is calculated from the determined proportion of change and the amount of the known weight in accordance with the proportionality: $X/(X \pm a) = D/D'$ where:

$X$ is the amount of unbalance $D'$ is representative of the amplitude of vibration with the known correction weight $D$ is representative of the amplitude of vibration without the known correction weight $a$ is the amount of known correction weight, and the sign in the expression $X \pm a$ is minus if the known weight is applied to subtract from the unbalance in the body and positive if the known weight is applied to add to the unbalance in the body.

As a feature of this invention means are provided for automatically determining the proportion of change of the amplitude of vibration between the rotations and calculating the actual amount of unbalance in the body. A meter with adjustable means therefor is provided by which the meter can be caused to reach a predetermined setting, such as full scale, responsive to the amplitude of vibrations of the body during one of the body rotation steps, and a scale is provided on the meter which is calibrated in accordance with the above function so that the adjusted meter will indicate directly the actual amount of unbalance in the wheel responsive to the signal representative of the amplitude of vibration during the other body rotation step.

It is also a feature of this invention to provide storing means for the amplitude representing signals so that the manipulations by which the direct readout of the unbalance may be made after the rotating operations on the body have been completed. The operator's task is thereby simplified since he can make the necessary adjustments for direct readout at his own leisure after the completion of the body spinning steps.

As an additional feature to this invention applicant includes a method and means for accurately determining the locus of unbalance for affixing the known and actual correction weights in spite of phase disturbances caused by varying damping factors in different suspension systems. By this method and means the body is caused to rotate about its axis in each direction and the apparent location of unbalance during each rotation is noted and marked. The actual location of unbalance lies on the radius which bisects the angular positions for the two apparent locations. By utilizing this technique in loose suspension systems, such as found on vehicles, an accurate position may be located for adding the known weight required to obtain an accurate direct readout of the actual amount of unbalance.

The features and advantages of this invention will become more apparent upon a further study of this specification especially when taken in conjunction with the accompanying drawings in which:

FIG. 1 is a schematic diagram of a preferred embodiment of a balance analyzer incorporating the teachings of this invention;

FIG. 2 is a plan view of the meter dial calibrated in accordance with the teachings of this invention;

FIGS. 3 and 4 are elevation views of vehicle wheels to be used in the description of the process for determining the locus of unbalance;

FIG. 5 is a schematic diagram partly in block form showing another embodiment of this invention; and FIG. 6 is a plan view of a meter dial calibrated in accordance with the teachings of the invention in which the known weight is added to the forces of unbalance.

Referring first to FIG. 1, there is shown an analyzer 10 by which through proper operation a direct readout may be obtained on an electric meter 12 having a dial 14 calibrated in accordance with the drawing of FIG. 2. The circuit 10 operates on the basic premise that the amplitude of vibration of the rotating body at a given speed will change a proportionate amount when a weight correction of a known value is applied to the wheel along the locus of the actual unbalance in the wheel. Thus, after establishing the locus of unbalance, the meter 12 can be adjusted to reach a predetermined value, such as full scale, responsive to the amplitude of vibrations of the actual unbalance of the rotating body. The subsequent rotation of the body with a known amount of correction weight properly placed along the unbalance locus to reduce the unbalance in the body will cause the meter pointer to read a reduced value. This reduced value is correlatable to the actual amount of unbalance by the relationship of the known amount of correction weight and the percentage of change in the detected vibrations. Thus, the dial 14 can be calibrated to directly read out the actual weight of the unbalance responsive to the known correction weight spin in accordance with the formula derived from the previously mentioned proportionality:

$$X = \frac{a}{1 - \frac{D'}{D}}$$

where:

$X$ is the actual amount of unbalance $D$ is representative of the amplitude of vibration without the known correction weight $D'$ is representative of the amplitude of vibration with the known correction weight, and $a$ is the absolute amount of known correction weight.

The scale of the dial 14 shown in FIG. 2 is based on the use of a known correction weight of one ounce, and, as may be seen, the markings thereon are in accordance with the hyperbolic function given above. As an example, suppose that the amount of actual, but unknown, unbalance in the body is two ounces. Since the circuits as will be described hereinafter provide a linear relationship between the amount of unbalance in the meter deflection, the addition of the one ounce correction weight will cause the meter to deflect half the amount that would be required for the unknown actual unbalance. Therefore, if the meter is adjusted so that its pointer 16 will deflect to the full scale SET mark responsive to the unknown balance, the pointer 16 will deflect to mid-scale responsive to the vibrations the one ounce correction weight adds to the body.

The dial 14 may be used as long as the correction weight to be added is one ounce, but if different correction weights are to be used another scale must be provided which is calibrated in accordance with the above formula. It may also be seen from the above expression that the scale can be calibrated directly in weight units as long as the known fixed correction of weight is placed on the body at the same radius as the determined correction weight. This, of course, is ideal in the application of the invention as a vehicle wheel unbalance analyzer. Furthermore, the above expression indicates that the same scale can be used for different size wheels as long as the same known correction weight is used so that the total procedure is obviously simplified. If the disclosed techniques are applied to industrial type balancers it may be preferable to calibrate the scale in terms of inch-ounces of unbalance rather than just weight units since the radius of placement of the known correction weight may be different from that at which the actual correction is to be applied. It is also to be noted that under certain circumstances it may be desirable to subtract the known correction weight, and the apparatus and method can readily be adapted to such procedure.

Reference is again made to FIG. 1 for a description of apparatus forming one embodiment of this invention. The vibrations caused by the unbalance in the rotating body are changed into electrical signals by means of a pickup unit 18 which is attachable to the vibration system on which the rotating body is mounted in a well known manner. U.S. Pat. No. 3,066,526, issued to Harry R. Tear on Dec. 4, 1961, shows a particularly suitable pickup unit of the velocity type for use herewith. The output signal from the pickup 18 is applied in a previously known manner through a strobe amplifier 20 to a strobe lamp 22 for the purposes of determining the locus of unbalance in a manner as will be hereinafter described. The pickup generated signal is also applied through a range attenuator 25 including resistors 24, 26 and 28 along with a range switch 30. The range attenuator is necessary, in view of the wide range in signal amplitudes caused by the same amount of unbalance in the wheels of different vehicles. In some industrial balancer applications, however, where the oscillating system is a part of the balancer itself, a range switch may not be required. The signal from the wiper 30a of the range switch is applied in one instance through a resistor 32 and diode 34 to the normally open contact 36a of a spring return pushbutton switch 36 and normally open contact 37c of spring return pushbutton switch 37 which perform the Store 1 and Store 2 functions as will be hereinafter described. The signal from range switch 30 is also provided through conductor 38, diode 40 and low pass filter 42 to the Run contact 43a of a Function switch 43 to provide a half wave rectified d.c. signal thereto. From the wiper 43b of the Function switch the signal is applied to the gate of a field effect transistor 44 connected as a source follower. The source output of transistor 44 is connected to one input of a differential amplifier 46 made up of transistors 48 and 50 and with meter 12 series connected with a variable resistance 52 between the collectors of the two transistors 48, 50. The other input to the differential amplifier comprises a variable resistor 56 series connected with a fixed resistor 58 between a voltage terminal 57 and ground which serves as a calibration adjustment setting for the system. The variable resistor 52 serves as a meter adjusting means for causing the meter to read full scale responsive to the amplitude of vibrations caused by the unbalance in the rotating body without the known correction weight.

The circuit as so far described provides a through circuit for the vibration signals from the pickup 18 to the meter 12, and this circuit, with function switch 43 in its run position, is used during the body spinning steps of the unbalance analyzing procedure. During these steps, however, the meter reading is not used as an accurate indication of the amount of unbalance, but rather to determine when the body is rotating at the resonant frequency of the system as would be evidenced by a peak in the meter reading as the rotating body coasts through its resonant speed.

A pair of storage circuits 59, 61 are provided for storing the signals as they are generated and to be subsequently used for determining the amount of unbalance. A pair of capacitors 60, 62 are interconnected with the Store 1 switch 36 for the purpose of storing a d.c. signal derived from the output of diode 34 during the rotation of the body without the known correction weight while a set of capacitors 64, 66 and 68 are interconnected with the Store 2 switch 37 to store a d.c. signal derived from diode 34 during the rotation of the body with the known correction weight added. The capacitor 60 is connected to the wiper 36b of the Store 1 switch and the capacitor 64, along with trimmer capacitor 66 are connected to the wiper 37b of the Store 2 switch 37 so that when either switch is momentarily depressed by the operator the capacitors will be charged to the peak level appearing at the respective contacts 36a, 37a. The capacitors 62 and 68 are respectively connected to the normally closed contacts 36c and 37c of their Store switches 36, 37 as well as to the Set contact 43c and the Read contact 43d of Function switch 43. Thus, when the switches 36, 37 are returned to their normal positions the respective capacitors 62, 68 will be charged in accordance with the signal level initially applied to the input capacitors 60, 64, 66. The capacitance divider configuration for the two storage circuits 59, 61 matches the peak voltages generated by the pickup unit 18 with the input requirements of the field effect transistor 44.

The Function switch 43, as may be seen, can be selectively operated to its Set or Read contacts to cause the meter 12 to give a reading in accordance with the signals stored in the respective storage circuits 59, 61. The high input impedance of the field effect transistor 44 prevents any appreciable leakage from the capacitor storage circuits so that the meter readings may be taken after the completion of all of the body spinning operations.

A storage indicator circuit 70 is associated with the two storage switches 36, 37 to indicate to the operator that one or both of the storage circuits 59, 61 have a signal stored therein. The circuit 70 is a bistable flip-flop made up of transistors 72, 74 connected in a well known configuration with a lamp 76 in the collector circuit of transistor 74. When either of the storage switches 36, 37 is operated, ground is applied through the respective switch arm 36d, 37d to the base of transistor 72 which turns it off and causes transistor 74 to conduct through the lamp 76. Thus, the illumination of lamp 76 warns the operator at the beginning of a balancing operation to discharge the Store circuit capacitors before proceeding with the unbalance analyzing procedure. This he does by operating the spring return pushbutton Clear switch 78 which temporarily grounds each of the storage capacitors through easily traced circuits. The indicator circuit 70 is also restored to its normal condition with indicator lamp 76 off by the application of ground to the base of transistor 74.

A preferred procedure for analyzing the unbalance in a rotating body such as a vehicle wheel utilizing the apparatus described will now be described. After jacking up the vehicle so that the wheel to be analyzed is hanging free and the pickup unit 18 is attached to the vehicle, a wheel spinner 80 is applied to the wheel B (FIG. 3) to cause it to rotate in a given direction as indicated by the arrow C. The wheel is brought up to a speed just over resonance and then allowed to coast down through resonance. As is well known, the flashes of the strobe lamp 22 actuated by the signals from the pickup unit 18, will cause the apparent image of the wheel to freeze in a certain position and this position is noted by the operator as the wheel passes through the resonant speed. The resonant speed is determined by watching for a peaking of the meter 12 with the Function switch 43 in its run position. When the apparent position of the wheel is noted, the wheel rotation is stopped and the wheel rotated by hand to that apparent position. Thus, if the air valve V was viewed at the apparent position shown in FIG. 3 at the resonant speed, the operator places the wheel in that position after the first spin and a mark $M_1$ placed at the topmost position of the wheel. Since a velocity pickup is being used and since the image is taken at resonance, the mark $M_1$ indicates the apparent position along the locus of unbalance at which a correction weight must be added to overcome the unbalance. This would be the true location except for the damping effects of the vehicle suspension system which change the phasing of the vibrations. To overcome this, the wheel is spun again but in the opposite direction, and the apparent position of the wheel is again noted at resonance. After the wheel is stopped, it is placed in the new apparent position noted under the strobe lamp and the second mark $M_2$ placed at the top of the wheel. The actual locus of unbalance is located along the line L which bisects the angle formed by marks $M_1$ and $M_2$ and it is in this position that correction weights are to be positioned on the wheel.

During the second spin and as the wheel coasts through the resonant position, the operator also depresses the Store 1 pushbutton switch 36 which will cause the capacitor 60 to charge to the maximum d.c.

signal level occurring at the store switch contact 36a. When the button is released the charge is divided between the capacitors 60 and 62 and held there until and unless the Clear button 78 is actuated. The signal corresponding to the unbalance without the known weight is now stored for later use.

A fixed weight of one ounce is next applied to the wheel on the locus L and the wheel again is spun in the same direction as the second spin to a speed just above resonance. The Store 2 pushbutton switch 37 is depressed as the wheel passes through resonance as noted by the peaking of meter 12 to cause the capacitors 64, 66 to charge to the d.c. level appearing at Store 2 contact 37a. When the pushbutton is released the charge is divided between the capacitors 64, 66 and 68 and will remain until cleared by the operation of Clear switch 78. The signal corresponding to the unbalance with the known correction weight is now stored for subsequent use.

The spin functions having been completed, the apparatus may now be operated to determine the actual amount of unbalance. The Function switch 43 is first placed in its set position to apply the signal stored in storage circuit 59 to the input of the field effect transistor 44. The signal output of transistor 48 unbalances the differential amplifier 46 causing the pointer 16 of the meter 12 to deflect in accordance with the unbalance. The operator manipulates the variable resistor 52 to cause the meter pointer 16 to read full scale as indicated by the SET mark on the dial shown in FIG. 2. The Function switch 43 is then turned to its Read position so that the signal stored in storage circuit 61 is applied to the field effect transistor 44. The unbalanced differential amplifier 46 will cause the meter 12 to read the actual amount of unbalance in the wheel on the calibrated scale 14. To balance the wheel the one ounce weight is removed from the wheel and a correction weight having the value indicated by the last meter reading is applied in its place.

As will be seen in FIG. 2, if the actual amount of unbalance is less than one ounce it will not register on the meter. However, an operator with a little bit of experience will be able to estimate the amount less than an ounce which is required and attach it to the wheel.

The above described circuit is an idealized arrangement because all of the wheel spinning procedures may be accomplished before any meter readings need be taken. This permits the operator to concentrate on those procedures and thus minimize errors. FIG. 5 shows another arrangement, however, which utilizes only one storage circuit for both signal storage functions, but which complicates the operating procedures to a slight extent.

In this arrangement a single storage circuit 100 is used and the Store switches and the Function switch are replaced by a single ganged rotary switch 102 which is to be operated in proper sequence along with the spin procedures. The same number of spins are required and a direct reading is obtained on the meter 12 of the amount of unbalance.

The first two spins in opposite directions by which the locus of unbalance and the signal indicative of the actual unbalance is stored are accomplished with the rotary switch 102 in its Run 1 position as indicated in FIG. 5. The signal generated by the pickup 18 is applied directly to the meter 12 through the circuit including an appropriate range attenuator 25', diode rectifier 104, filter capacitor 106, Run 1 contact 107 on the second deck of switch 102, switch arm 102b, meter 12, switch arm 102c and contact 110 to ground. Since the meter 12 is used only to show the resonant peak, the fact that it is not driven by the differential amplifier 46 is of no consequence. The actual unbalance signal is stored in the storage circuit 100 by manipulation of the switch 108 and is held on capacitors 112, 114 while the operator switches the function switch 102 to the second or Set 2 position. The signal in the storage circuit 100 is thus applied over conductor 110 and through the field effect transistor 44 to the differential amplifier 46. The meter 12 is driven by the differential amplifier through the variable resistance 52 and the second position rotary switch contacts 116, 118 as may be readily traced. As in the previous embodiment, the variable resistance 52 is manipulated to obtain a full scale setting responsive to the actual unbalance signal stored in circuit 100. When the operator rotates the switch 102 to the third or Clear position, the storage device 100 is discharged to ground through conductor 120. The known weight of one ounce is attached to the wheel at the proper location and the rotary switch rotated to its fourth or Run 4 position which connects the circuit in the same manner as described for the Run 1 position. The d.c. signal representing the amount of unbalance with the known correction weight is stored in the storage circuit 100 by manipulation of the switch 108. The Read 5 position of the rotary switch 102 again connects the storage circuit 100 to the field effect transistor 44 and the meter 12 across the output of the differential amplifier 46 so that it will give a direct reading of the amount of actual unbalance in the wheel. Thus, the apparatus of FIG. 5 requires the same number of steps to obtain the direct readout of unbalance on the meter. However, more attention must be paid to the actual sequence of steps since the charge stored on capacitors 112, 114 will be lost whenever the rotary switch passes the Clear 3 position.

The above methods and apparatuses have been directed to the mode of operation by which the known correction weight is applied to the body in a manner to be subtractive of the actual amount of unbalance. This mode is preferred in applications such as vehicle wheel balancing because the operator places the known amount of weight and the actual correction weight on the same angular location on the wheel to correct the unbalance. The disadvantage of this mode of operation is that it requires a meter scale such as shown in FIG. 2 in which correction valves less than the known weight amount cannot be indicated unless a meter movement is used which is responsive to both positive and negative signals.

A mode of operation can also be used by which the known correction weight is applied to the body so as to be additive to the actual unbalance in the wheel. In this case the formula for calibrating the meter scale would be $$X = \frac{a}{\frac{D'}{D} - 1}$$

where the symbols have the same meaning expressed for the previously described function. It may be seen that in this case a meter scale which reads down to zero can be used such as shown in FIG. 6 if the known amount of applied weight is one ounce and the meter is adjusted to read to the full scale Set mark responsive to the amplitude of vibrations of the body rotating with the known weight applied thereto. This mode of operation can readily be used with the circuit shown in FIG. 1 by merely reversing the functions of the contacts 43c and 43d of the Function switch 43 so that the meter 12 is adjusted to the Set mark responsive to the Store 2 charge in the known weight storage circuit 61. The circuit of FIG. 5 can be used as is, but in that case the procedure must be altered to rotate the body with the known weight applied when the rotary switch 102 is at its Run-1 position, and to rotate the body without the known weight applied when the switch is at its Run-4 position.

It is also to be noted that the methods and apparatuses disclosed herein may be used to determine the dynamic or couple type of unbalance. For example, to determine the amount of couple unbalance in a vehicle wheel the operator would attach the pickup to the back of the brake backing plate in a horizontal plane including the axis of rotation of the wheel. The same method steps are then used to determine the locus of unbalance and the amount of unbalance except that two weights of the known amount are applied to the wheel diametrically opposite each other and on opposite faces of the wheel. If a meter scale of the type shown in FIG. 2 is used, then the known weights must be applied to subtract from the actual couple unbalance and the meter adjusted in accordance with the actual unbalance vibrations. If the meter scale of FIG. 6 is used, then the known weights are applied to be additive to the actual couple unbalance and the meter adjusted in accordance with the vibrations during the known weight rotations.

While there has been shown two embodiments of vibration analyzing apparatus embodying the teachings of this invention, it will be recognized that other modifications or additions may be made thereto without materially deviating from the teachings herein. It is therefore intended to be bound only by the scope of the appended claims.

What is claimed is:

1. Apparatus for analyzing unbalance in a rotatable body comprising means for rotating said body, means for determining the angular locus of unbalance in said body, means for providing a first signal representative of the amount of unbalance in said body, means for providing a second signal representative of the amount of unbalance in said body with a known amount of change in unbalance applied thereto along the locus, a meter, means for applying said first and second signals to said meter, means for adjusting said meter to a predetermined setting responsive to one of said first and second signals, said meter when adjusted adapted to read the amount of unbalance responsive to the application of said other signal; wherein said first and second signal providing means comprise means for generating d.c. signals having a level proportional to the amplitude of vibration of said rotating body, and means for storing said d.c. signals; wherein said adjusting means comprises a variable resistance, and wherein said signal applying means comprises a differential amplifier having said meter and said variable resistance series connected across its output, a field-effect transistor connected to the input of said differential amplifier, and switch means for selectively connecting said storing means to the gate input of said field-effect transistor.

2. In the apparatus of claim 1 wherein said storing means comprises,
a pair of capacitors,
means for charging one of said capacitors to the d.c. level representative of the amplitude of vibration of the rotating body without the known change, and
means for charging the other of said capacitors to the d.c. level representative of the amplitude of vibration of the rotating body with the known change in unbalance.

3. In the apparatus of claim 1 wherein said storing means comprises,
a capacitor,
means for charging said capacitor to the d.c. level representative of the amplitude of vibration of the rotating body without the known weight, and
means for discharging the capacitor and recharging same to the level representative of the amplitude of vibrations of the rotating body with the known weight.

4. A method of balancing a rotatable body comprising the steps:
a. spinning the body about its rotational axis,
b. determining the angular locus of unbalance while said body is spinning,
c. providing a first electric signal the amplitude of which is proportional to the amount of unbalance at a particular speed and adjusting a meter calibrated in accordance with the formula $D' = D(X-a)/X$ to give an unbalance set point reading, $D$, in response to the first electrical signal,
d. applying a known amount of test weight a diametrically opposite the angular locus of unbalance determined by step, (b),
e. spinning the body with the known test weight a applied diametrically opposite the angular locus of unbalance,
f. providing a second electric signal to the set point adjusted meter the amplitude of which is proportional to the amount of unbalance with the known test weight $a$ being applied (i.e., $X-a$) at said particular speed,
g. determining the actual amount of unbalance in the body in accordance with the proportionality $(X)/(X-a) = (D)/(D')$ by direct reading of the meter during step (f) in which varying meter calibrations, $D'$, are displayed to read in terms of unbalance correction weight, and where in the above steps:
$X$ is the actual amount of unbalance,
$D$ is proportional to the amplitude on the first signal,
$D'$ is proportional to the amplitude of the second signal, and
$a$ is the known amount of test weight,
h. and placing a weight to correct the unbalance of said body in an amount determined by step (g) diametrically opposite the angular locus of unbalance.

5. The method of claim 4 is which the unbalance set point reading is located at full scale.

6. The method of claim 4 in which the particular speed is that at which resonance occurs in the rotatable body.

7. A method of balancing a rotatable body comprising the steps:
   a. spinning the body about its rotational axis,
   b. determining the angular locus of unbalance while said body is spinning,
   c. applying a known amount of test weight a at the locus of unbalance and providing a first electric signal the amplitude of which is proportional to the amount of unbalance plus the applied test weight at a particular speed and adjusting a meter calibrated in accordance with the formula $D = (D'X/X+\pi\zeta a)$ to give unbalance set point reading, $D'$, in response to the first electrical signal,
   d. removing the known amount of test weight $a$,
   e. spinning the body with the test weight $a$ removed,
   f. providing a second electric signal the amplitude of which is proportional to the amount of unbalance at said particular speed,
   g. determining the actual amount of unbalance in the body in accordance with the proportionality $(X)/(X+a) = D/D'$ by direct reading of the meter during step (f) in which varying meter calibrations, D, are displayed to read in terms of unbalance correction weight, and where in the above steps:
   $X$ is the actual amount of unbalance,
   $D'$ is proportional to the amplitude of the first signal,
   $D$ is proportional to the amplitude of the second signal, and
   $a$ is the known amount of test weight,
   h. and placing a weight to correct the unbalance of said body of an amount determined by step (g) diametrically opposite the angular locus of unbalance.

8. The method of claim 7 in which the unbalance set point reading is located at full scale.

9. The method of claim 7 in which the particular speed is that at which resonance occurs in the rotatable body.

10. In apparatus for balancing a rotatable body by use of a known test weight $a$, the improvement comprising means for spinning the body about its rotational axis, means for determining the angular locus of unbalance while said body is spinning, means for providing a first electric signal the amplitude of which is proportional to the amount of unbalance at a particular speed, a meter calibrated in accordance with the formula $D' = D(X-a)/X$, means adjustable to give an unbalance set point meter reading $D$ in response to the first electric signal, means for providing a second electric signal to the set point adjusted meter the amplitude of which is proportional to the amount of unbalance with the known test weight $a$ being applied diametrically opposite the angular locus of unbalance (i.e., $X-a$) at said particular speed, and means determining the actual amount of unbalance in the body in accordance with the proportionality $(X)/(X-a = D/D'$ by direct meter readout in which varying meter calibrations, D', are displayed to read in terms of unbalance correction weight, and where in the above:
   $X$ is the actual amount of unbalance,
   $D$ is proportional to the amplitude of the first signal,
   $D'$ is proportional to the amplitude of the second signal, and
   $a$ is the known amount of test weight.

11. The apparatus of claim 10 in which the unbalance set point reading is located at full scale.

12. In apparatus for balancing a rotatable body by use of a known test weight $a$, the improvement comprising means for spinning the body about its rotational axis, means for determining the angular locus of unbalance while said body is spinning, means for providing a first electric signal the amplitude of which is proportional to the amount of unbalance plus a test weight applied at the locus of unbalance at a particular speed, a meter calibrated in accordance with the formula $D = (D'X/X+\alpha)$, means adjustable to give an unbalance set point meter reading $D'$ in response to the first electric signal, means providing a second electric signal the amplitude of which is proportional to the amount of unbalance at said particular speed with said test weight removed, and means determining the actual amount of unbalance in the body in accordance with the proportionality $(X)/(X+a) = D/D'$ by direct meter readout in which varying meter calibrations, D, are displayed to read in terms of unbalance correction weight and where in the above:
   $X$ is the actual amount of unbalance,
   $D'$ is proportional to the amplitude of the first signal,
   $D$ is proportional to the amplitude of the second signal, and
   $a$ is the known amount of test weight.

13. The apparatus of claim 12 in which the unbalance set point reading is located at full scale.

* * * * *

UNITED STATES PATENT OFFICE
CERTIFICATE OF CORRECTION

Patent No. 3,680,390　　　　　　　　Dated August 1, 1972

Thomas E. Bjorn

It is certified that error appears in the above-identified patent and that said Letters Patent are hereby corrected as shown below:

Column 11, line 17, that portion of the formula in parentheses should be deleted and should read $(D'X/X + a)$ Signed and sealed this 13th day of February 1973.

(SEAL)
Attest:

EDWARD M. FLETCHER, JR.　　　　　ROBERT GOTTSCHALK
Attesting Officer　　　　　　　　　Commissioner of Patents